(12) United States Patent
Gregorio

(10) Patent No.: US 12,300,089 B2
(45) Date of Patent: May 13, 2025

(54) SHARING OF AT LEAST ONE NEIGHBOR PREMISES DEVICES WITH A PREMISES SECURITY SYSTEM

(71) Applicant: The ADT Security Corporation, Boca Raton, FL (US)

(72) Inventor: Daymein Gregorio, Clarksville, TN (US)

(73) Assignee: The ADT Security Corporation, Boca Raton, FL (US)

( * ) Notice: Subject to any disclaimer, the term of this patent is extended or adjusted under 35 U.S.C. 154(b) by 128 days.

(21) Appl. No.: 18/298,680

(22) Filed: Apr. 11, 2023

(65) Prior Publication Data

US 2024/0346909 A1 Oct. 17, 2024

(51) Int. Cl.
G08B 25/00 (2006.01)
G08B 13/196 (2006.01)
H04N 7/18 (2006.01)

(52) U.S. Cl.
CPC ..... *G08B 25/008* (2013.01); *G08B 13/19645* (2013.01); *G08B 13/1968* (2013.01); *H04N 7/181* (2013.01); *H04N 7/186* (2013.01)

(58) Field of Classification Search
CPC ............ G08B 25/008; G08B 13/19645; G08B 13/1968; H04N 7/181; H04N 7/186
See application file for complete search history.

(56) References Cited

U.S. PATENT DOCUMENTS

| | | | |
|---|---|---|---|
| 8,934,754 B2 | 1/2015 | Billau et al. | |
| 8,937,661 B1 | 1/2015 | Slavin et al. | |
| 9,711,036 B2* | 7/2017 | Fadell | G06Q 10/063 |
| 9,870,694 B2 | 1/2018 | Eyring et al. | |
| 10,257,469 B2 | 4/2019 | Edwards et al. | |
| 10,360,779 B2* | 7/2019 | Correnti | G08B 25/08 |
| 10,950,119 B2 | 3/2021 | Davies et al. | |
| 11,651,665 B2* | 5/2023 | Scalisi | G08B 3/10 348/143 |
| 2012/0257061 A1* | 10/2012 | Edwards | G08B 13/00 348/E7.085 |
| 2017/0322942 A1* | 11/2017 | Duda | H04L 67/52 |
| 2018/0218582 A1* | 8/2018 | Hodge | H04N 21/44004 |
| 2018/0233010 A1* | 8/2018 | Modestine | H04N 7/186 |
| 2019/0213817 A1* | 7/2019 | Wechsler | G07C 9/00563 |
| 2020/0120309 A1 | 4/2020 | Siminoff | |

* cited by examiner

*Primary Examiner* — Mohamed Barakat
(74) *Attorney, Agent, or Firm* — Weisberg I.P. Law, P.A.

(57) ABSTRACT

According to some embodiments, a premises security system for monitoring a premises is provided and includes at least one computing device configured to receive a notification indicating at least one of a plurality of neighbor premises devices associated with a neighbor premises security system will be shared with the premises security system according to a schedule. The at least one computing device is further configured to: during a non-alarm state of the premises security system, access at least one of a plurality of neighbor premises devices according to the schedule and receive neighbor premises data comprising at least one of: media captured by the at least one of the plurality of neighbor premises devices or a notification associated with the at least one of the plurality of neighbor premises devices; and perform at least one action based on the neighbor premises data.

19 Claims, 5 Drawing Sheets

SHARING OF AT LEAST ONE NEIGHBOR PREMISES DEVICES WITH A PREMISES SECURITY SYSTEM

TECHNICAL FIELD

The present technology is generally related to premises security systems.

BACKGROUND

Premises security systems use one or more premises devices to monitor a premises. For example, these premises security systems use various sensors to gather data about detected events for determining whether to trigger an alarm. Further, these premises security systems tend to operate autonomously and independent of each other.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
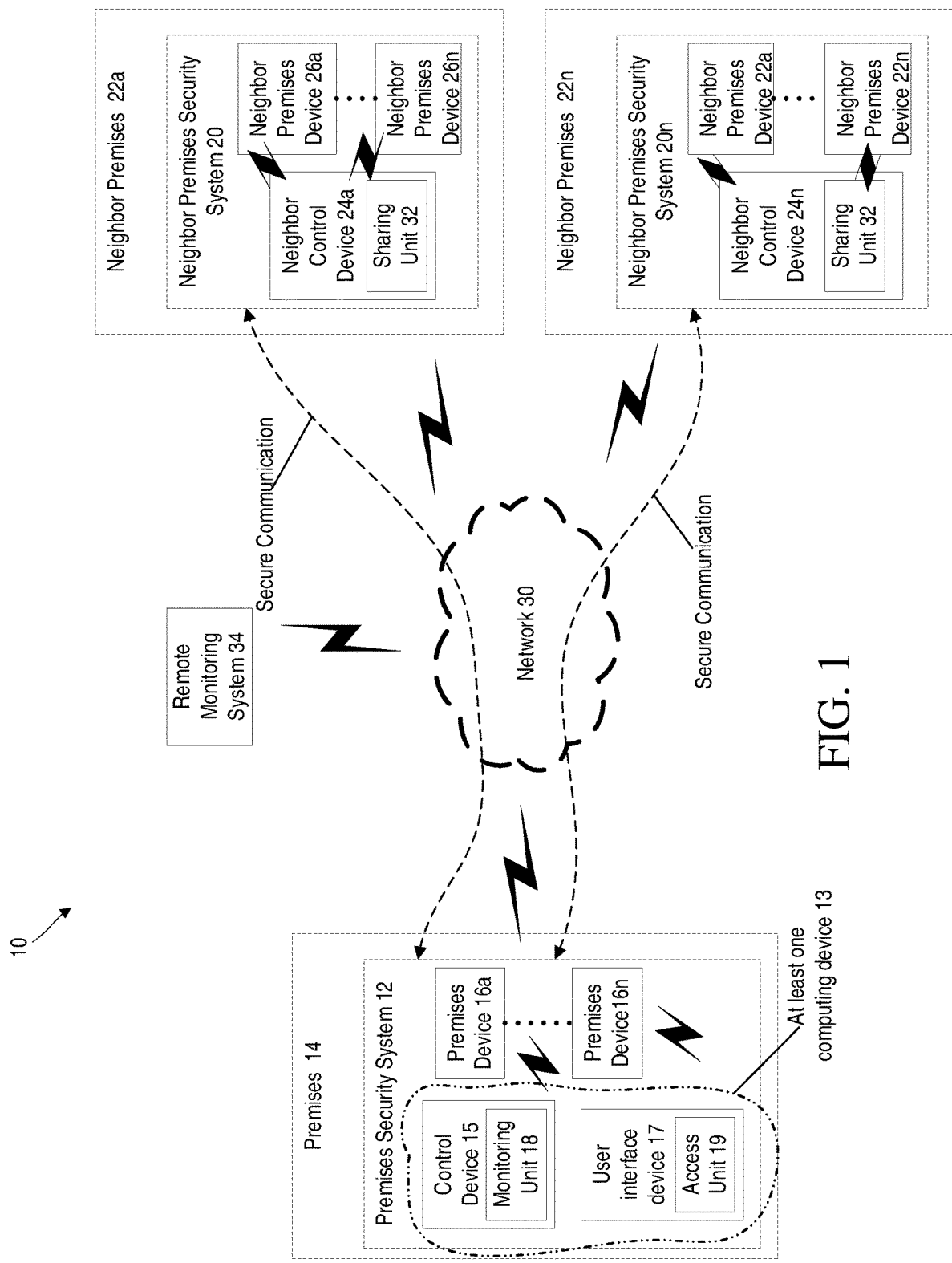
FIG. 1 is an example of a system according to some embodiments of the present disclosure.

Existing premises security systems tend to limit usage of their premises devices to the system with which they are associated. However, the range of the premises security system may be limited by, for example, the field of view of a camera mounted on the exterior of a home or business.

Various embodiments of the present disclosure may expand the effective range of premises security systems by, for example, providing a premises security system access to at least one neighbor premises device, as described herein. As a non-limiting example according to various embodiments of the present disclosure, the neighbor of the premises security system owner, who also has a premises security system, has granted access to their exterior cameras (i.e., neighbor premises devices) every day from 8 pm to 8 am. One night, the premises security system owner's home is broken into, and several items were stolen. The premises security system worked as intended, but the thief knew the location of their exterior camera of the premises security system and parked out of the field of view. With the existing system limitations, law enforcement would have little information on which to act. Fortunately, for the premises security system owner, the neighbor's camera detected motion as the thief's vehicle was parked in front of their home. According to various embodiments of the present disclosure, the recordings can now be accessed by the premises security system owner and provided to law enforcement in their pursuit to apprehend the thief and recover the stolen goods.

By allowing preconfigured access to nearby or neighbor premise devices, the surveillance range increases and possibly overlaps, thereby increasing the range of the premises security system beyond the premises. Hence, one or more embodiments described herein may advantageously increase the range and/or abilities of a premises security system to improve security and safety by incorporating the neighbor premises device(s) of a neighbor premises security system through a secure process in which premises security system owners can choose which neighbor premises devices are shared with a specific system on a schedule of their choosing.

Before describing in detail exemplary embodiments, it is noted that some embodiments may reside in combinations of apparatus components and processing steps related to providing access to at least one neighbor premises device of a neighbor preemies security system for use by a premises security system. Accordingly, components may be represented where appropriate by conventional symbols in the drawings, focusing on details that facilitate understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a," "an" and "the" are intended to include the plural forms as well, unless the context clearly indicates otherwise. The terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. Multiple components may interoperate and modifications and variations are possible to achieve electrical and data communication.

In some embodiments described herein, the term "coupled," "connected," and the like, may be used herein to indicate a connection, although not necessarily directly, and may include wired and/or wireless connections.

Referring now to the drawing figures in which like reference designators refer to like elements there is shown in FIG. 1 a system designated generally as "10." System 10 may include premises security system 12 that is configured to monitor premises 14. Premises security system 12 includes and/or is associated with at least one computing device 13 and one or more premises devices 16a-16n (collectively referred to as "premises device 16"). The at least one computing device 13 includes control device 15 and one or more user interface devices 17. In some embodiments, the functionality performed by control device 15 and user interface device 17 may be performed by a single computing device 13. In some embodiments, control device 15 and user interface device 17 are separate computing devices 13, which is the example illustrated in FIG. 1.

Control device 15, premises device 16 and user interface device may communicate via one or more wired or wireless communication channels. Control device 15 may be configured to include monitoring unit 18 for performing one or more processes described herein such as with respect to receiving and using access to a at least one neighbor premises device. User interface device 17 may include access unit 19 for performing one or more processes described herein, such as with respect to requesting and gaining access to at least one neighbor premises device.

System 10 further includes one or more neighbor premises security systems 20a-20n (collectively referred to as "neighbor premises security system 20") that are configured to monitor respective premises 22a-22n (collectively referred to as "premises 22"). Neighbor premises security system 20 includes neighbor control device 24 and one or more neighbor premises devices 26a-26n (collectively referred to as neighbor premises device 26) for monitoring the premises 22. Neighbor control device 24 and neighbor premises device 26 may communicate via one or more wired or wireless communication channels. Premise security system 12 use communicate with neighbor premises security system 20 via network 30 and/or via short range communication protocols, as described herein. As used in one or more embodiments, "neighbor premises security system 20" may be in a predefined graphical region (e.g., neighborhood, radio, etc.) with respect to premises security system 12.

In one or more embodiments, neighbor control device 24 may include sharing unit 32 that is configured to perform one or more functions related to sharing access to one or more neighbor premises devices 26, as described herein.

Premises devices 16a-16n and neighbor premises devices 26a-26n may include sensors, controllers, images capture devices, life safety devices, lifestyle devices and/or other devices. For example, the types of sensors may include various life safety related sensors, such as motion sensors, fire sensors, carbon monoxide sensors, flooding sensors and contact sensors, among other sensor types. The controllers may include, for example, one or more lifestyle related devices configured to adjust at least one premises setting such as lighting, temperature, energy usage, door lock and power settings, among other settings associated with the premises or devices on the premises. Image capture devices may include digital cameras and/or video cameras, among other image or video capture devices. In one or more embodiments, the image capture device is configured to stream captured media (e.g., audio and video) as described herein.

User interface device 17 may be a wireless device (e.g., wireless mobile device, computer, laptop, tablet, among other devices) that is configured to communicate with premises security system 12, such as for streaming media, controller configurations, initiating the sharing process described herein, etc. User interface device 17 may be a security control panel (e.g., keypad/interface). In one or more embodiments, user interface device 17 (e.g., security control panel) may be part of premises security system 12 and may be associated with premises security system 12, such as via a client software application stored on the user interface device 17. User interface device 17 may communicate with one or more elements in premises security system 12 using one or more wired and/or wireless communication protocols. While not shown, neighbor premises security system 20 may be associated with one or more respective user interface devices 17.

System 10 may further include one or more networks 30 (collectively referred to as "network 30"). Network 30 may be a wide area network, local area network, wireless local network and metropolitan area network, among other networks. Network 30 may provide communications among one or more of entities in system 10.

System 10 may further include one or more remote monitoring system 34 (collectively referred to as "remote monitoring system 34"), communicating with at least one other entity in system 10 such as with premises security system 12 and/or neighbor premises security system 20 via network 30 for responding to security alarms that are communicated from control device 15 and/or neighbor control device 24.

Figure 2:
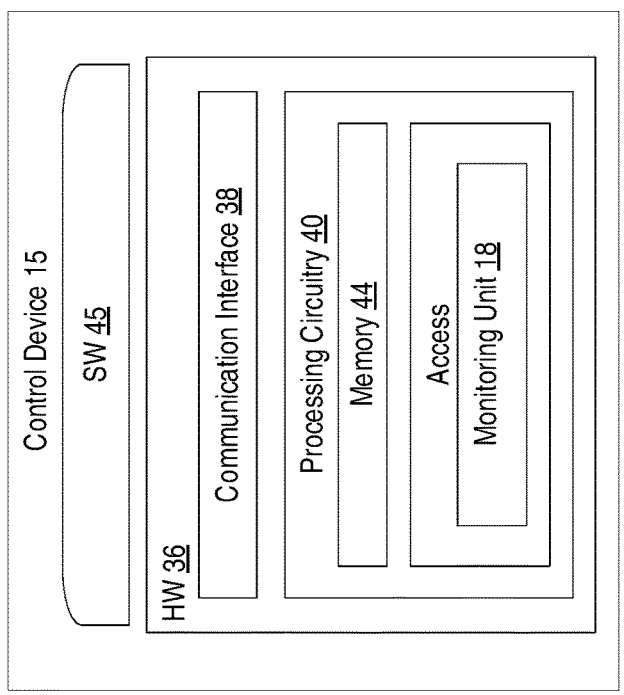
FIG. 2 is a block diagram of control device according to some embodiments of the present disclosure.

With respect to FIG. 2, the example system 10 includes a control device 15 that includes hardware 36 enabling the control device 15 to communicate with one or more entities in system 10 and to perform one or more functions described herein.

The hardware 36 may include a communication interface 38 for setting up and maintaining at least a wired and/or wireless connection to one or more entities in system 10, such as remote monitoring system 34, premises device 16, neighbor premises device 26, neighbor control device 28, among other entities in system 10, etc.

In the embodiment shown, the hardware 36 of control device 15 further includes processing circuitry 40. The processing circuitry 40 may include a processor 42 and a memory 44. In particular, in addition to or instead of a processor, such as a central processing unit, and memory, the processing circuitry 40 may comprise integrated circuitry for processing and/or control, e.g., one or more processors, processor cores, field programmable gate arrays (FPGAs), and/or application specific integrated circuits (ASICs) adapted to execute instructions. The processor 42 may be configured to access (e.g., write to and/or read from) the memory 44, which may comprise any kind of volatile and/or nonvolatile memory, e.g., cache, buffer memory, random access memory (RAM), read-only memory (ROM), optical memory, and/or erasable programmable read-only memory (EPROM).

The control device 15 further has software 45 stored internally in, for example, memory 44, or stored in external memory (e.g., database, storage array, network storage device, etc.) accessible by the control device 15 via an external connection. Software 45 may include a client application for establishing securing communications with control device 15. The software 45 may be executable by the processing circuitry 40. The processing circuitry 40 may be configured to control any of the methods and/or processes described herein and/or to cause such methods, and/or processes to be performed, e.g., by control device 15. Processor 42 corresponds to one or more processors 42 for performing control device 15 functions described herein. The memory 44 is configured to store data, programmatic software code and/or other information described herein. In some embodiments, the software 45 may include instructions that, when executed by the processor 42 and/or other processing circuitry 40, cause the processor 42 and/or processing circuitry 40 to perform the processes described herein with respect to control device 15. For example, processing circuitry 40 of the control device 15 may include monitoring unit 18, which is configured to perform one or more functions described herein such as with respect to, for example, using access to at least one neighbor premises device 26 and initiating at least one action, as described herein.

Figure 3:
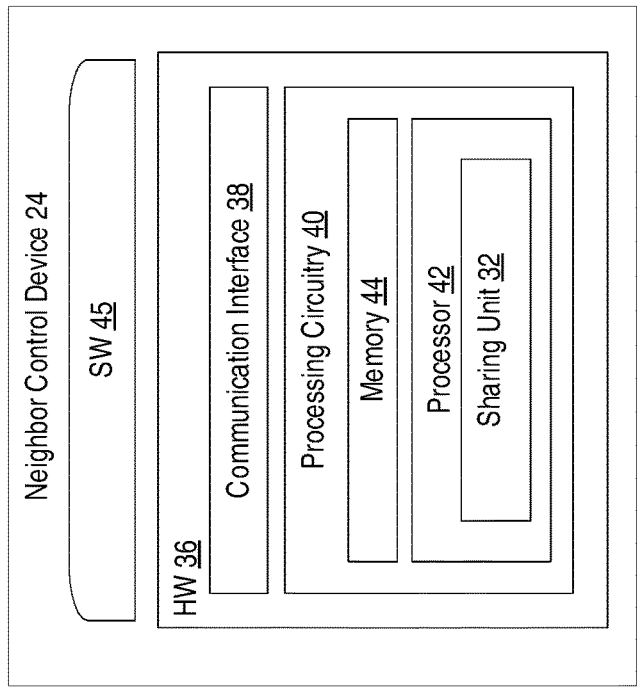
FIG. 3 is a block diagram of a neighbor control device according to some embodiments of the present disclosure.

FIG. 3 is a block diagram of a neighbor control device 24 according to some embodiments of the present disclosure.

Neighbor control device 24 includes hardware and software as described with respect to control device 15 except that processing circuitry 40 is configured to include sharing unit 32 for performing one or more neighbor control device 24 functions as described herein such as with respect to providing access to at least one neighbor premises device 26 to premises security system 12.

Figure 4:
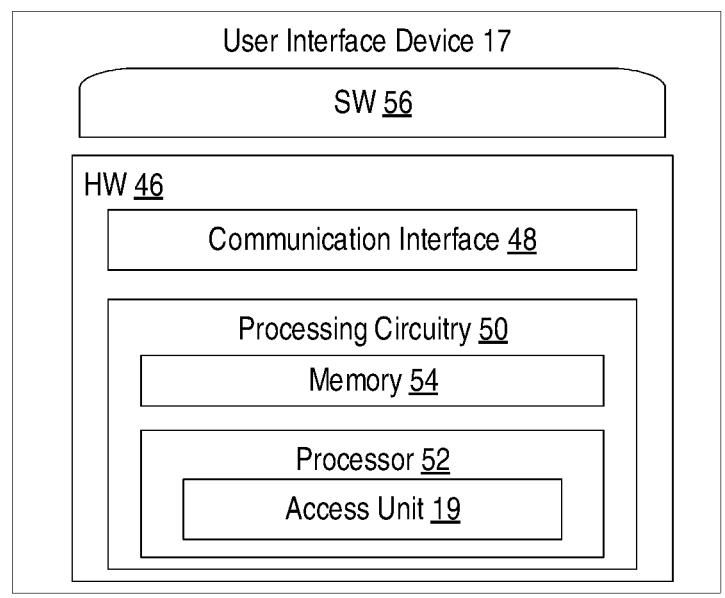
FIG. 4 is a block diagram of user interface device according to some embodiments of the present disclosure.

FIG. 4 is a block diagram of a user interface device 17 according to some embodiments of the present disclosure. User interface device 17 includes hardware 46 enabling the user interface device 17 to communicate with one or more entities in system 10 and to perform one or more functions described herein.

The hardware 46 may include a communication interface 48 for setting up and maintaining at least a wired and/or wireless connection to one or more entities in system 10 such as with premises device 16, control device 15, neighbor control device 24, among other entities in system 10, etc.

In the embodiment shown, the hardware 46 of user interface device 17 further includes processing circuitry 50. The processing circuitry 50 may include a processor 52 and a memory 54. In particular, in addition to or instead of a processor, such as a central processing unit, and memory, the processing circuitry 50 may comprise integrated circuitry for processing and/or control, e.g., one or more processors, processor cores, FPGAs, and/or ASICs adapted to execute instructions. The processor 52 may be configured to access (e.g., write to and/or read from) the memory 54, which may comprise any kind of volatile and/or nonvolatile memory, e.g., cache, buffer memory, RAM, ROM, optical memory, and/or EPROM.

The user interface device 17 further has software 56 stored internally in, for example, memory 54, or stored in external memory (e.g., database, storage array, network storage device, etc.) accessible by the user interface device 17 via an external connection. Software 56 may include a client application for establishing securing communications with neighbor control device 24. The software 56 may be executable by the processing circuitry 40. The processing circuitry 50 may be configured to control any of the methods and/or processes described herein and/or to cause such methods, and/or processes to be performed, e.g., by user interface device 17. Processor 52 corresponds to one or more processors 52 for performing user interface device 17 functions described herein. The memory 54 is configured to store data, programmatic software code, and/or other information described herein. In some embodiments, the software 56 may include instructions that, when executed by the processor 52 and/or processing circuitry 50, cause the processor 52 and/or processing circuitry 50 to perform the processes described herein with respect to user interface device 17. For example, processing circuitry 50 of the user interface device 17 may include access unit 19, which is configured to perform one or more functions described herein such as with respect to, for example, gaining scheduled access to at least one neighbor premises device 26, as described herein.

While control device 15 and neighbor control device 24 are shown as having different units (i.e., monitoring unit 18, sharing unit 32), in one or more embodiments, each control device 15 or 24 may include both units 18 and 32. Further, in one or more embodiments, access unit 19 may be included in one or more of control device 15 and neighbor control device 24.

Although FIGS. 2-4 show monitoring unit 18, access unit 19 and sharing unit 32 as being within a respective processor, each unit may be implemented such that a portion of the unit is stored in a corresponding memory within the processing circuitry. In other words, the unit may be implemented in hardware or in a combination of hardware and software within the processing circuitry.

Figure 5:
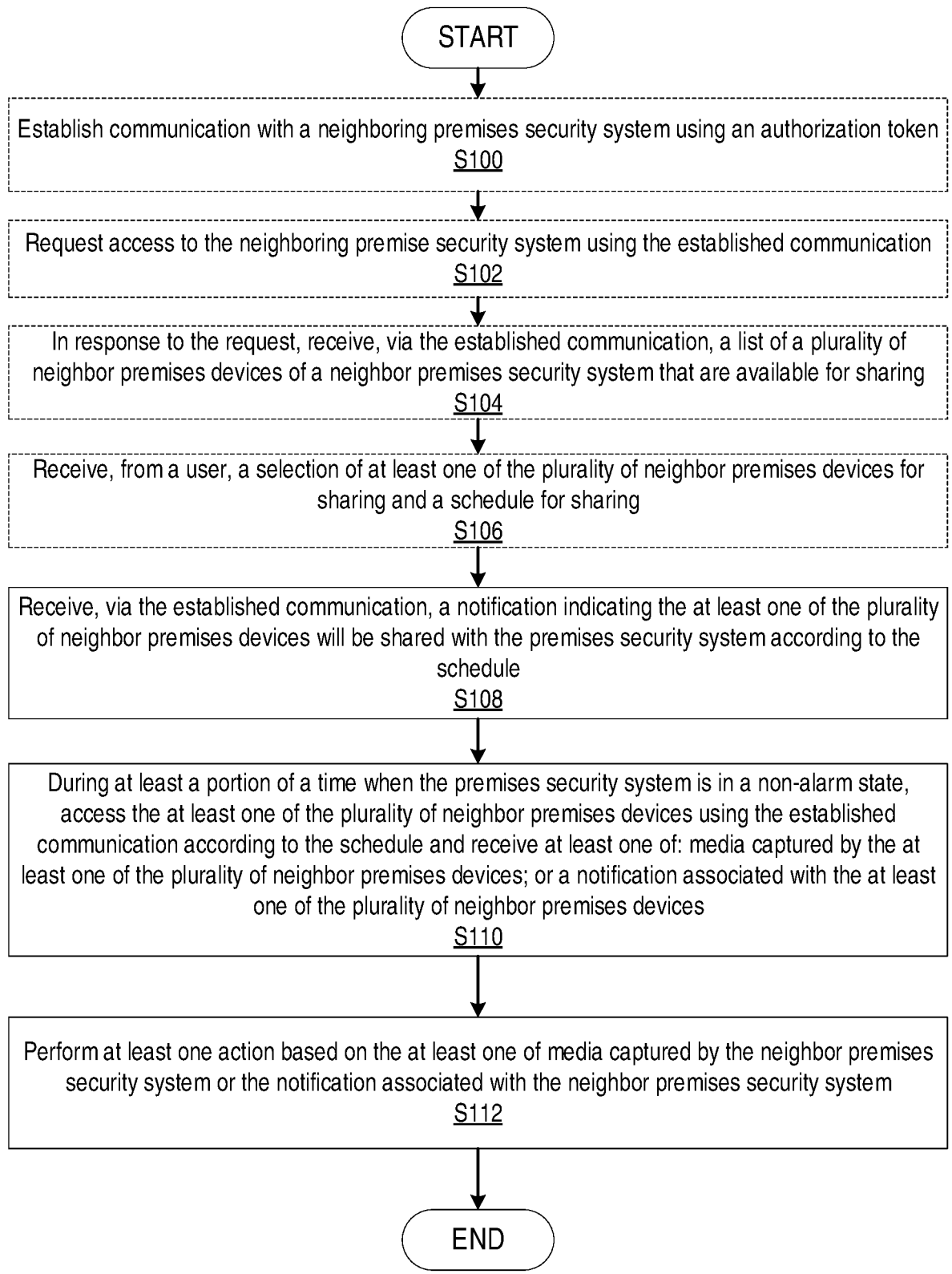
FIG. 5 is a flowchart of an example process according to some embodiments of the present disclosure.

FIG. 5 is a flowchart of an example process according to some embodiments of the present disclosure. One or more blocks described herein may be performed by at least one computing device 13 such as, for example, one or more elements of control device 15, such as by one or more of hardware 36, communication interface 38 processing circuitry 40 (including access unit 19), processor 42, memory 44, etc. and/or one or more of hardware 46, communication interface 48, processing circuitry 50 (including access unit 19), processor 52, memory 54, etc. In some embodiments, one or more blocks with dashed lines in FIG. 5 are optional steps.

The at least one computing device 13 is configured to establish (Block S100) communication with a neighbor premises security system 20 using an authorization token, as described herein. The at least one computing device 13 is configured to request (Block S102) access to the neighbor premise security system 20 using the established communication, as described herein. The at least one computing device 13 is configured to, in response to the request, receive (Block S104), via the established communication, a list of a plurality of neighbor premises devices 26 of a neighbor premises security system 20 that are available for sharing, as described herein.

The at least one computing device 13 is configured to receive (Block S106), from a user, a selection of at least one of the plurality of neighbor premises devices 26 for sharing and a schedule for sharing, as described herein. The at least one computing device 13 is configured to receive (Block S108), via the established communication, a notification indicating the at least one of the plurality of neighbor premises devices 26 will be shared with the premises security system 12 according to the schedule, as described herein. The at least one computing device 13 is configured to, during at least a portion of a time when the premises security system 12 is in a non-alarm state, access the at least one of the plurality of neighbor premises devices 26 using the established communication according to the schedule and receive (Block S110) at least one of media captured by the at least one of the plurality of neighbor premises devices 26 or a notification associated with the at least one of the plurality of neighbor premises devices 26, as described herein. The at least one computing device 13 is configured to perform (Block S112) at least one action based on the at least one of media captured by the neighbor premises security system 20 or the notification associated with the neighbor premises security system 20.

According to one or more embodiments, the non-alarm state of the premises security system 12 corresponds to a disarm state or an armed state without an alarm having been triggered.

According to one or more embodiments, the media comprises at least one of a video or at least one image.

According to one or more embodiments, the media is part of a live stream or recording.

According to one or more embodiments, the notification associated with the at least one of the plurality of neighbor premises devices 26 corresponds to: a triggered alarm notification, motion notification; or smoke detection notification.

According to one or more embodiments, the at least one of the plurality of neighbor premises devices 26 comprises at least one outdoor premises device 26 and at least one indoor premises device 26.

According to one or more embodiments, the at least one action comprises: causing the premises security system 12 to enter an armed state, and causing a notification to the user of the premises security system 12.

According to one or more embodiments, the at least one computing device 13 is further configured to receive sensor data from a premises device 16 of the premises security system 12, and trigger an alarm based on the received sensor data from the premises device 16, and the at least one of the media captured by the at least one of the plurality of neighbor premises devices 26 and the notification associated with the at least one of the plurality of neighbor premises devices 26.

According to one or more embodiments, the at least one computing device 13 is further configured to receive an update notification indicating that the access to the at least one of the plurality of neighbor premises devices 26 according to the schedule has been modified by a user of the neighbor premises security system 20; and determine whether to access at least one of the plurality of neighbor premises devices 26 based on the update notification.

According to one or more embodiments, the modifying to the access corresponds to revoking access or changing access to at least one neighbor premises device 26.

According to one or more embodiments, the at least one of the plurality of neighbor premises devices 26 includes a first neighbor premises device 26 that allows for two way communication between the user of the premises security system 12 and the first neighbor premises device 26.

Figure 6:
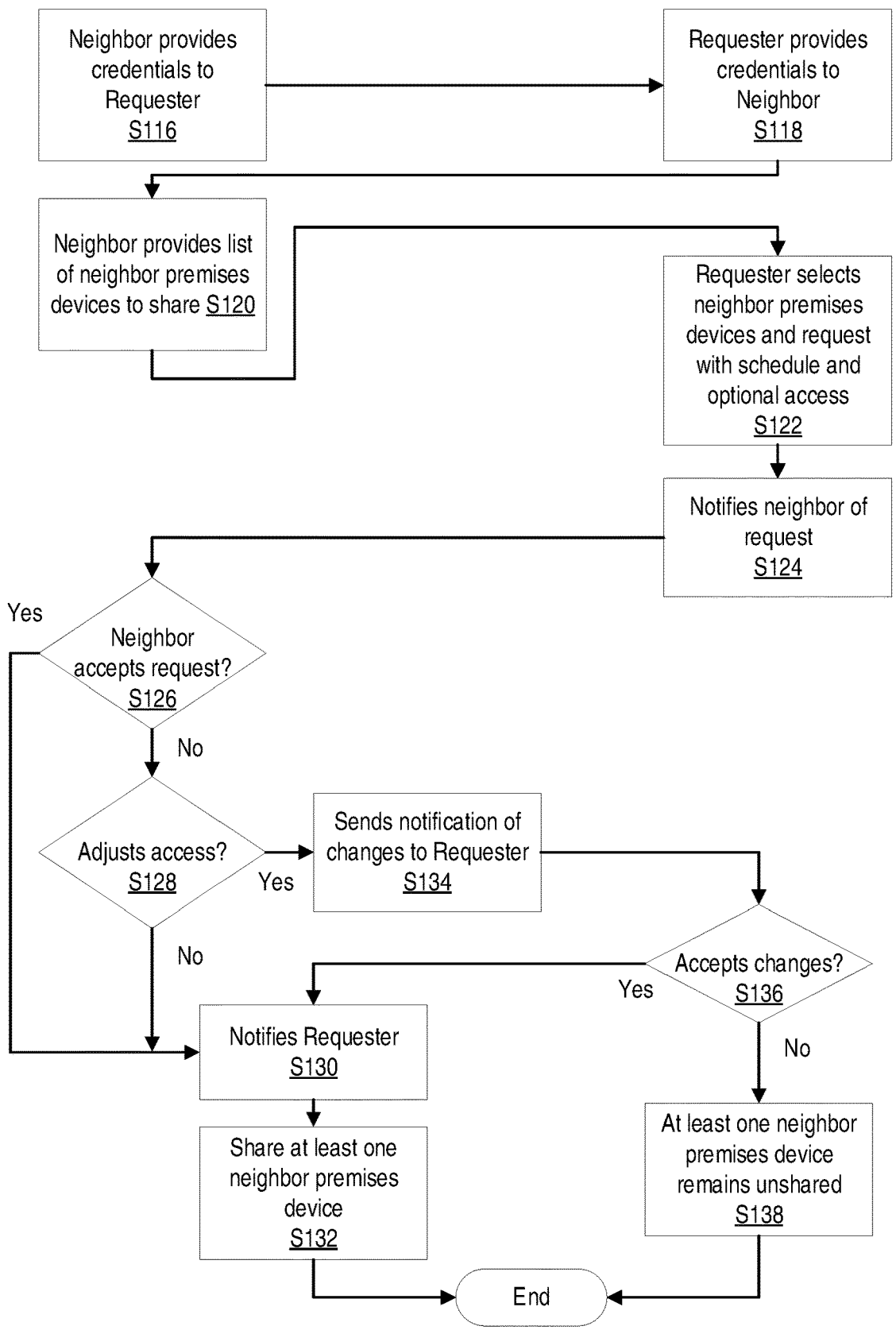
FIG. 6 is a flowchart of another example process according to some embodiments of the present disclosure.

FIG. 6 is a flowchart of an example process according to some embodiments of the present disclosure. One or more blocks described herein may be performed by at least one computing device 13 such as, for example, one or more elements of user interface device 17, such as by one or more of hardware 46, communication interface 48, processing circuitry 50 (including access unit 19), processor 52, memory 54, etc., and/or by one or more elements of neighbor control device 24, such as by one or more of hardware 36, communication interface 38 processing circuitry 40 (including sharing unit 32), processor 42, memory 44, etc.

The owner ("Requester") of the premises security system 12 and the owner ("Neighbor") of neighbor premises security system 20 would securely establish a link (e.g., establish security communications) between their systems by providing credentials (e.g., at least one authorization token) to each other such as via at least one computing device 13 (e.g., wireless device such as a user interface device 17) and neighbor control device 24 (or neighbor's user interface device 17) (Blocks S116-S118). For example, using a wireless device (e.g., user interface device 17): the owners of the premises security systems would log into the security application on respective wireless devices and mint an authorization token to ensure a secure connection between premises security systems 12 and 20 such as by, for example, using a type of short-range communication. In another example, using a web portal: the owner of the neighbor premises security system 20 being requested provides the requester (owner of the premises security system 12) with a key (e.g., software key). The owner of the premises security system 12 would cause an authorization token to be minted through a web portal to ensure a secure connection between systems.

Alternatively or in addition to the examples above, a neighbor premises security system 20 may be discoverable for sharing in various other manners. For example, a user of premises security system 12 may be configured to receive a notification on a mobile software application operating on user interface device 17 about neighbor premises security systems 20 that have opted into sharing at least one neighbor premises device 26. In another example, a user of a neighbor premises security system 20 may be provided with an electronic identifier (e.g., Quick Response (QR) code, web link, etc.) that the user can post online such as in a neighborhood blog or website page, thereby allowing other neighbors to initiate the process of sharing at least one neighbor premises device 26 as described herein. In one example, a user of the neighbor premise security system 20 may be provided with a security system sign to place in their yard or in front of their home or premises where the sign has a scannable electronic identifier (e.g., QR code), thereby allowing other neighbors walking by the home to initiate the sharing process described herein. In another embodiment the neighbor premises security system 20 can be configured to only allow access to sharing at least one neighbor premises device 26 for users that are within predetermined geographic range, i.e., within a geofence.

After establishing secure communications, the Requester (e.g., via at least one computing device 13) is provided with a pre-approved list of neighbor premises device(s) 26 of the neighbor premises security system 20 that are available for sharing (Block S120). For example, the user of neighbor premises security system 20 may preconfigure a list or indication of neighbor premises devices 26 of the neighbor premises security system 20 that the user is willing to share. Such neighbor premises devices 26 may include outdoor camera(s), doorbell camera, etc.

The Requester selects one or more neighbor premises devices 26 from the list along with one or more schedules of access (Block S122). For example, the Requester may request to access the neighbor's outdoor camera on certain days and/or times according to a schedule. In some embodiments, the Requester can request different schedules of access for different neighbor premises devices 26 on the list. Further, the Requester may also request for optional access (described below) for one or more neighbor premises devices 26.

The user (or owner) of the neighbor premises security system 20 is notified of the request (Block S124) and may approve the request (Block S126), modify the request (Block S128) or reject the request. For example, if the user of the neighbor premises security system 20 approves the requests via neighbor control device 24 or neighbor user interface device, the Requester receives a notification such as at user interface device 17 that the request was approved (Block S130). At this point, the neighbor premises devices 26 of the neighbor premises security system 20 that were indicated in the request are now shared according to the schedule in the request (Block S132). That is, the sharing of at least one neighbor premise device 26 of a neighbor premises security system 20 with a premises security system 12 advantageously occurs at least while the premises security system 12 is in a non-alarm state (e.g., a disarm state, an armed state without an alarm having been triggered) thereby allowing the premises security system 12 to performed actions based on data and/or information received from its premises devices 16 and neighbor premises devices 26.

In another example, the user of the neighbor premises security system 20 determines to adjust the requested access and provides customized approval (Block S128). That is, the user of neighbor premises security system 20 removes or adds one or more neighbor premises devices 26, removes or adds functionality (e.g., two-way talk, audio, etc.) and/or modifies the requested access schedule. The Requester is notified of the changes such as via the at least one computing device 13 (e.g., user interface device 17) (Block S134). If the Requester accepts the changes (Block S136), the one or more neighbor premises devices 26 of the neighbor premises security system 20 that are part of the customized approval are now shared with the premises security system 12 (Block S132) and the Requester is notified such as via the user interface device 17. However, if the Requester does not accept the changes, the neighbor premises devices 26 of the neighbor premises security system 20 remain unshared with the premises security system 12 of the requester (Block S138).

In one or more embodiments, allowing premises security system 12 and/or the Requester access to one or more neighbor premises device 26 of a neighbor premise security system 20 may begin on the date and time when the request was approved and only for the approved scheduled times.

One example type of access is "Required Access" (e.g., minimum access) that corresponds to a minimum amount of access and/or minimum amount of sharing of approved neighbor premises devices 26. For example, the Required Access includes (during approved scheduled times) access and/or sharing of one or more of: Cameras-live video stream, recordings and notifications; Sensors-notifications, Doorbell Camera-live video stream, recordings and notifications. Another example type of access is "Optional Access" that corresponds to access that the user of the neighbor premises security system 20 can optionally grant in addition to the Required Access. For example, Optional Access can be granted or approved (during scheduled times) for one or more of: Cameras—audio, two-way communication, Doorbell Camera—audio, two-way communication, which accesses that are noted included in the Required Access.

Further, while two types of accesses are described above, the access provided to the premises security system 12 may be configurable at the premises device level and/or functionality level. For example, the user of the neighbor premises security system 20 may approve sharing of live stream(s) from one or more neighbor premises devices 26 but may not allow the sharing of recordings. In another example, the user of the neighbor premises security system 20 may allow the sharing of recordings for motion detection. In another example, the user of the neighbor premises security system 20 may allow the sharing of motion in video that was tagged by the neighbor premises security system 20.

In another example, the user of the neighbor premises security system 20 may allow limited access to specific internal neighbor premises devices 26, such as one or more of a smoke detector, motion detector, glass break sensor, etc. such that the premises security system 12 will receive and/or have access to one or more of notifications, sensor data, live video stream, recorded video stream, etc. Such access may be advantageous to the user of the neighbor premises security system 20 in various situations, such as if the neighbor's premises is empty for an extended period of time (e.g., several days, week(s), etc.).

Further, in one example, after a premises security system 12 is provided access to at least one neighbor premises device 26 according to the approved schedule, a neighbor premises security system 20 triggers an alarm (e.g., fire alarm, carbon monoxide alarm, etc.). In the event of an emergency, the neighbor premises security system 20 may be configured to dynamically provide additional access to the neighbor premises security system 20. That is, in response to a predefined alarm event, neighbor premises security system 20 is configured to provide dynamic access to one or more neighbor premises devices 26. The dynamic access may occur outside of the approved schedule for sharing and/or may include access to at least one neighbor premises device 26 that was not originally shared with the premises security system 12. In such an example, the neighbor may specify that the owner is permitted access to specified premises devices 26 and/or associated features during an alarm event.

In one or more embodiments, the premises security system 12 may receive one or more notifications associated with one or more neighbor premises security systems 20 where the premises security system 12 may use the accumulation of notifications to perform the at least one action and/or perform predictive analysis to predict the issue associated with the notifications. In one example, premises security system 12 uses a series of notifications to notify one or more user's in a predefined geographic area and/or to initiate first responders to the area and/or specific premises. For example, if premise security system 12 receives the same type of notification (e.g., intruder notification) from one or more neighbor premises security systems 20, the premises security system 12 may perform at least one action (e.g., arm the security system, trigger drone monitoring, etc.) based on the accumulation of notifications. In another example, the accumulation of various types of notifications (e.g., motion notification, window sensor notification, etc.) from one or more neighbor premises security systems 20, may cause premise security system 12 to trigger one or more predefined actions.

Further, at any time, the user and/or owner of the neighbor premises security system 20 can modify or revoke access of one or more neighbor premises devices 26, and the Requester can be notified of any such changes.

Hence, embodiments in accordance with the present disclosure may advantageously provide a method of expanding the range and/or abilities of a premises security system 12 by accessing neighbor premises devices 26 of one or more additional neighbor premises security systems 20 to increase the safety and security of the expanded premises security system 12.

The concepts described herein may be embodied as a method, data processing system, computer program product and/or computer storage media storing an executable computer program. Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. Each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Additionally, one or more blocks may be omitted according to various embodiments. Although some of the diagrams include arrows on communication paths to show a primary direction of communication, the communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the present invention is not limited to what has been specifically shown and described herein above. In addition, unless mention was made above to the contrary, the accompanying drawings are not to scale. A variety of modifications and variations are possible in light of the above teachings without departing from the scope and spirit of the present disclosure.

What is claimed is:

1. A premises security system for monitoring a premises, the premises security system comprising:
at least one computing device comprising:
at least one processor; and
at least one memory storing a plurality of instructions that, when executed by the at least one processor, cause the at least one computing device to:
establish communication with a neighbor premises security system using an authorization token;
request access to the neighbor premise security system using the established communication;
in response to the request, receive, via the established communication, a list of a plurality of neighbor premises devices of a neighbor premises security system that are available for sharing;
receive, from a user, a selection of at least one of the plurality of neighbor premises devices for sharing and a schedule for sharing;
receive, via the established communication, a notification indicating the at least one of the plurality of neighbor premises devices will be shared with the premises security system according to the schedule;
during at least a portion of a time when the premises security system is in a non-alarm state, access the at least one of the plurality of neighbor premises devices using the established communication according to the schedule and receive at least one of:
media captured by the at least one of the plurality of neighbor premises devices; or
a notification associated with the at least one of the plurality of neighbor premises devices; and
perform at least one action based on the at least one of media captured by the neighbor premises security system or the notification associated with the neighbor premises security system.

2. A premises security system for monitoring a premises, the premises security system comprising:
at least one computing device comprising:
at least one processor; and
at least one memory storing a plurality of instructions that, when executed by the at least one processor, cause the at least one processor to:
establish communication with a neighbor premises security system using an authorization token;
request access to the neighbor premise security system;
in response to the request, receive a list of a plurality of neighbor premises devices of the neighbor premises security system that are available for sharing;
receive a notification indicating at least one of the plurality of neighbor premises devices associated with the neighbor premises security system will be shared with the premises security system according to a schedule;
during a non-alarm state of the premises security system, access at least one of a plurality of neighbor premises devices according to the schedule and receive neighbor premises data comprising at least one of:
media captured by the at least one of the plurality of neighbor premises devices; or
a notification associated with the at least one of the plurality of neighbor premises devices; and
perform at least one action based on the neighbor premises data.

3. The premises security system of claim 2, wherein the non-alarm state of the premises security system corresponds to a disarm state or an armed state without an alarm having been triggered.

4. The premises security system of claim 2, wherein the plurality of instructions are further configured to cause the at least one processor to:
receive, from a user, a selection of at least one of the plurality of neighbor premises devices for sharing and a schedule for sharing; and
the notification indicating the at least one of a plurality of neighbor premises devices associated with a neighbor premises security system will be shared with the premises security system according to the schedule being based on the user selection.

5. The premises security system of claim 2, wherein the media comprises at least one of a video or at least one image.

6. The premises security system of claim 5, wherein the media is part of a live stream or recording.

7. The premises security system of claim 2, wherein the notification associated with the at least one of the plurality of neighbor premises devices corresponds to:
a triggered alarm notification;
motion notification; or
smoke detection notification.

8. The premises security system of claim 2, wherein the at least one of the plurality of neighbor premises devices comprises at least one outdoor premises device and at least one indoor premises device.

9. The premises security system of claim 2, wherein the at least one action comprises:
causing the premises security system to enter an armed state; and
causing a notification to a user of the premises security system.

10. The premises security system of claim 2, wherein the plurality of instructions are further configured to cause the at least one processor to:
receive sensor data from a premises device of the premises security system; and
trigger an alarm based on:
the received sensor data from the premises device; and
the at least one of the media captured by the at least one of the plurality of neighbor premises devices and the notification associated with the at least one of the plurality of neighbor premises devices.

11. The premises security system of claim 2, wherein the plurality of instructions are further configured to cause the at least one processor to:
receive an update notification indicating that the access to the at least one of the plurality of neighbor premises devices according to the schedule has been modified by a user of the neighbor premises security system; and
determine whether to access at least one of the plurality of neighbor premises devices based on the update notification.

12. The premises security system of claim 11, wherein the modifying to the access corresponds to revoking access or changing access to at least one neighbor premises device.

13. The premises security system of claim 2, wherein the at least one of the plurality of neighbor premises devices includes a first neighbor premises device that allows for two way communication between a user of the premises security system and the first neighbor premises device.

14. A method implemented by a premises security system that is configured to monitor a premises, the method comprising:
establishing communication with a neighbor premises security system using an authorization token;
requesting access to the neighbor premise security system;
in response to the request, receiving a list of a plurality of neighbor premises devices of the neighbor premises security system that are available for sharing;
receiving a notification indicating at least one of the plurality of neighbor premises devices associated with the neighbor premises security system will be shared with the premises security system according to a schedule;
during a non-alarm state of the premises security system, access at least one of a plurality of neighbor premises devices according to the schedule and receive neighbor premises data comprising at least one of:
media captured by the at least one of the plurality of neighbor premises devices; or
a notification associated with the at least one of the plurality of neighbor premises devices; and
perform at least one action based on the neighbor premises data.

15. The method of claim 14, wherein the non-alarm state of the premises security system corresponds to a disarm state or an armed state without an alarm having been triggered.

16. The method of claim 14, further comprising:
receiving, from a user, a selection of at least one of the plurality of neighbor premises devices for sharing and a schedule for sharing; and
the notification indicating the at least one of a plurality of neighbor premises devices associated with a neighbor premises security system will be shared with the premises security system according to the schedule being based on the user selection.

17. The method of claim 14, wherein the media comprises at least one of a video and at least one image; and
the media being part of a live stream or recording.

18. The method of claim 14, wherein the at least one action comprises:
causing the premises security system to enter an armed state; and
causing a notification to a user of the premises security system.

19. The method of claim 14, further comprising:
receiving an update notification indicating that the access to the at least one of the plurality of neighbor premises devices according to the schedule has been modified by a user of the neighbor premises security system; and
determining whether to access at least one of the plurality of neighbor premises devices based on the update notification.

* * * * *